April 8, 1941.     J. J. PATERNO     2,237,630
PROTECTING AND SEALING DEVICE FOR BATTERY TERMINALS
Filed July 30, 1940
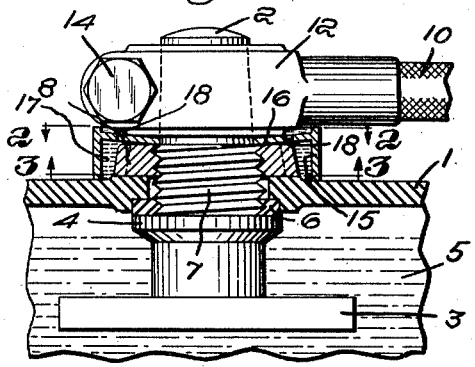
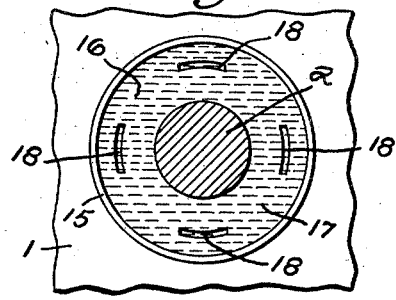
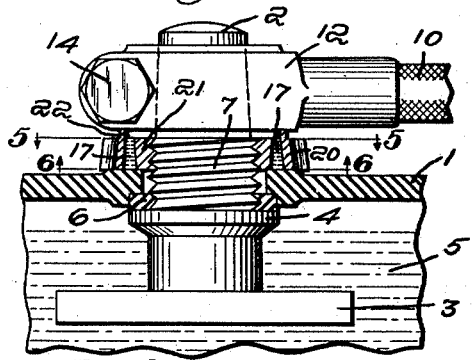
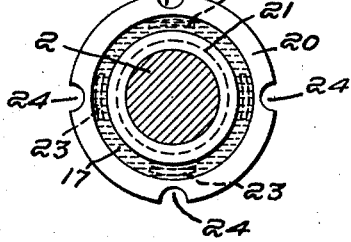
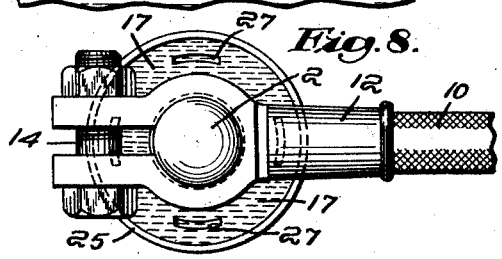
Inventor:
Joseph J. Paterno
by James R. Hodder
Attorney Patented Apr. 8, 1941

2,237,630

UNITED STATES PATENT OFFICE 2,237,630

PROTECTING AND SEALING DEVICE FOR BATTERY TERMINALS

Joseph J. Paterno, Salem, Mass.

Application July 30, 1940, Serial No. 348,380

1 Claim. (Cl. 173—259)

My present invention is a novel and improved device or apparatus for protecting and sealing the terminals and connections in storage batteries, particularly such as are employed on automobile starting batteries or the like.

Heretofore considerable difficulty has been experienced with the corrosion of terminals and battery connections, cable-connecting clamps, and the like in storage batteries as the acid from the battery leaks by the terminals and attacks and corrodes the cable connections. This is particularly damaging in the case of automobile storage batteries which are under constant agitation and vibration, and which frequently require attachment of and detachment from the terminals by the connecting cables, the acid working out from the battery during the vibration of the automobile in which the same are carried and producing an acidulated condition on the outside terminals and connections.

Many efforts have been previously made to correct this condition but none have been completely satisfactory, and my present invention aims to produce a more efficient and terminal-sealing and protecting device to prevent such corrosion as above noted, and furthermore to provide a device which can be attached either to the battery terminal or to the cable clamp.

Referring to the drawing illustrating preferred embodiments of the invention:

Fig. 1 is a cross-sectional view illustrating in fragmentary form a battery and cable together with a connecting terminals and clamp and my improved sealing and protecting device applied thereto;

Fig. 2 is a cross-sectional view on the line 2—2 of Fig. 1;

Fig. 3 is a cross-sectional view on the line 3—3 of Fig. 1;

Fig. 4 is a further view partly in cross-section of a modified form;

Fig. 5 is a cross-sectional view on the line 5—5 of Fig. 4;

Fig. 6 is a cross-sectional view on the line 6—6 of Fig. 4;

Fig. 7 is a view partly in cross-section of a sealing device attached to the cable clamp, and Fig. 8 is a plan view of the same.

As shown in the drawing, a storage battery casing is indicated generally at 1, and the projecting terminal post 2 extends from one of the cells 3 inside the battery outwardly thru the casing, said terminal post having a shouldered portion 4 within the casing 1 containing an electrolyte 5.

The shouldered portion 4 compresses a gasket or washer 6 on the inside of the casing 1 between said shoulder and the casing, while the post 2 has a threaded part 7 to be engaged by a nut 8 to hold the post 2 in assembled position. A cable 10 has a clamping terminal 12 attached thereto and secured by a bolt 14 tightly about the post 2.

The construction just described is of standard type, and my invention includes the utilization of a sealing and protecting member, comprising a circular metal holder 15 with an intermediate web 16 in the form of a dished surface, having a central recess to fit about the terminal post 2 and to fit over the nut 8, thus providing an annular space between the nut 8 and the inner side of the walls of the metal holder 15, which space is filled with grease 17. A plurality of recesses 18 are provided in the dished web 16 to permit the grease 17 to be applied to the top of same, either when the clamp 14 is released and the cable terminal 12 removed, or by filling in each side of the cable terminal with grease on top of the dished web 16 which will quickly work downwardly into the recess between the nut and the encircling holder 15. This form of the device is adapted to be applied to existing terminal clamps and connections. The feature of the dished member 16 facilitates the flowing of the grease from the top of the web 16 where it can be readily applied into the space between the holder and the nut 8.

The normal heat from the battery when in service expedites this action, maintaining the grease in contact with the surfaces and effectually sealing the terminal against escape of interior acids and thus protecting the clamp and terminal against corrosion, insuring longer life and wear of the battery and connections so equipped with my device.

In Fig. 4, a somewhat modified construction is illustrated, wherein the encircling holder 20 is formed as the clamping nut with its interior diameter 21 threaded to engage the threaded portion 7 of the post 2 and with a grease-receiving recess formed between the threaded portion 21 and the outer surface of the washer 20.

In this form, the necessity of the nut 8 is eliminated and my device is, itself, the post-retaining nut and grease-receiving holder. Preferably, a rim 22 is provided on which the bottom of the clamp 12 may rest, and grease 17 can be filled inside the rim with a series of openings 23 around the rim similar to the openings or slots 18 in the former construction. As the holder 20 is, itself, the nut in this construction, I provide a series of spanner recesses 24, or the like, to facilitate rotating the holder and tightening the threaded nut portion 21 on the thread 7 of the post.

In the form shown in Figs. 7 and 8, I have illustrated my novel improved protecting and sealing device as constituting a part of the terminal and clamp for the terminal 10 so that the grease-holder and terminal can be simultaneously applied and secured by the clamp 14.

For this purpose, I form the lower part of the terminal 12 with a holder 25 integral with or secured thereto, by welding or the like, thru the attachment of the dished web portion 26 attached to the bottom of the terminal, said dished web also having recesses 27 therethru corresponding to the openings 18 in Fig. 1, and 23 in Fig. 4.

In this type of attachment, with the grease-containing holder as a part of or secured to the terminal and clamp, the post 2 will be held by the threaded nut 8, as in the form shown in Fig. 1; and the grease-containing holder 25 attached simultaneously with the attachment of the cable and terminal. After attachment, the grease 17 can be refilled by applying grease to the top of the web 26 at each side of the terminal 12, permeating thru the openings 27 as will be clearly appreciated and as shown in Fig. 8.

I claim:

A grease-holding and protecting receptacle for sealing a terminal post of a battery, comprising a hollow member adapted to encircle the battery post and contain a quantity of grease therein, a web extending across said receptacle intermediate its height and with a central recess adapted to fit the battery post, said web being formed with a plurality of recesses therethrough, whereby grease may be applied to the interior of the member from the upper side of said web thru said recesses and contain a quantity of grease on the upper side of said web in addition to that within the receptacle.

JOSEPH J. PATERNO.